US010552775B2

(12) United States Patent
Wei

(10) Patent No.: US 10,552,775 B2
(45) Date of Patent: Feb. 4, 2020

(54) SYSTEM AND METHOD FOR OPTIMIZING A MATERIAL MOVING OPERATION

(71) Applicant: Caterpillar Inc., Peoria, IL (US)

(72) Inventor: Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 484 days.

(21) Appl. No.: 15/363,602

(22) Filed: Nov. 29, 2016

(65) Prior Publication Data
US 2018/0150779 A1 May 31, 2018

(51) Int. Cl.
G06Q 10/06 (2012.01)
E02F 3/76 (2006.01)
E02F 3/84 (2006.01)
E02F 9/20 (2006.01)
G05D 1/02 (2006.01)

(52) U.S. Cl.
CPC ..... *G06Q 10/06313* (2013.01); *E02F 3/7604* (2013.01); *E02F 3/841* (2013.01); *E02F 9/205* (2013.01); *G05D 1/0276* (2013.01)

(58) Field of Classification Search
CPC .............................. G06Q 10/00; G06Q 30/02
USPC .................................................. 705/7.11–7.42
See application file for complete search history.

(56) References Cited

U.S. PATENT DOCUMENTS

| 5,631,658 A | 5/1997 | Gudat et al. |
| 5,875,854 A | 3/1999 | Yamamoto et al. |
| 6,076,030 A | 6/2000 | Rowe |
| 6,108,949 A | 8/2000 | Singh et al. |
| 6,167,336 A | 12/2000 | Singh et al. |
| 6,591,145 B1 | 7/2003 | Hoskinson et al. |
| 6,823,616 B1 | 11/2004 | Gutter et al. |
| 8,078,441 B2 | 12/2011 | Greiner et al. |
| 8,306,836 B2 * | 11/2012 | Nichols ............ G06Q 10/06313 705/7.11 |
| 8,467,943 B2 | 6/2013 | Dersjö et al. |
| 8,620,535 B2 | 12/2013 | Friend et al. |
| 8,880,334 B2 * | 11/2014 | Kini ..................... G05D 1/0027 701/23 |
| 8,948,981 B2 | 2/2015 | Wei et al. |
| 8,983,738 B2 * | 3/2015 | Avitzur .................. E02F 9/205 701/50 |
| 9,014,922 B2 | 4/2015 | Edara et al. |

(Continued)

FOREIGN PATENT DOCUMENTS

| CN | 102418346 A | 4/2012 |
| WO | WO 2016/033634 A1 | 3/2016 |

OTHER PUBLICATIONS

Kaboli and Carmichael, Emission and Cost Configurations in Earthmoving Operations, Jan. 4, 2012, The University of New South Wales, Sydney Australia, pp. 394-402.*

*Primary Examiner* — Robert D Rines
(74) *Attorney, Agent, or Firm* — Leydig, Voit & Mayer, Ltd.

(57) ABSTRACT

A system for determining a lowest cost distal end dump location is provided. A controller determines an amount of material to be moved from the first work area to the second work area, and evaluates a plurality of potential distal end dump locations at the second work area to determine a cost associated with moving the material at the second work area to form each second work area material configuration and select a lowest cost distal end dump location corresponding to a lowest cost second work area material configuration.

18 Claims, 8 Drawing Sheets

(56) References Cited

U.S. PATENT DOCUMENTS

| | | |
|---|---|---|
| 9,014,924 B2 | 4/2015 | Edara et al. |
| 9,228,315 B2 | 1/2016 | Edara et al. |
| 2009/0198505 A1 | 8/2009 | Gipps et al. |
| 2012/0191431 A1* | 7/2012 | Dunbabin ............. E02F 9/2029 703/6 |
| 2013/0035978 A1* | 2/2013 | Richardson .......... G06Q 10/087 705/7.27 |
| 2014/0012404 A1 | 1/2014 | Taylor et al. |
| 2014/0180444 A1 | 6/2014 | Edara et al. |
| 2017/0138016 A1* | 5/2017 | Wei ....................... E02F 9/2045 |
| 2017/0344011 A1* | 11/2017 | Stratton ............... G05D 1/0219 |

\* cited by examiner

SYSTEM AND METHOD FOR OPTIMIZING A MATERIAL MOVING OPERATION

TECHNICAL FIELD

This disclosure relates generally to controlling a machine and, more particularly, to a system and method for planning a path of a machine to optimize the cost of a material moving operation.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

When operating in an autonomous or semi-autonomous manner, minimizing the need for operator intervention is desirable. Operating instructions for moving the machines and their associated work implements are often developed by a planning system or module. However, a plurality of variables may affect the planning system and impact the efficiency of the machine operation. Optimizing certain of the variables may result in material movement operations performed in a highly cost effective manner.

U.S. Pat. No. 9,014,922 discloses a system for determining a cut location at a work surface in which a controller stores a desired operating parameter and a final design plane of the work surface and determines an actual profile of the work surface. The controller determines a plurality of target profiles corresponding to different cut locations. The target profiles are based at least in part upon the cut location, a loading profile, slot parameters, and the actual profile of the work surface. The controller further determines an optimized target profile relative to the desired operating parameter and the optimized target profile defines an optimized cut location.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system is provided for determining a lowest cost distal end dump location for moving material with a ground engaging work implement of a machine along a work surface from a first work area to a second work area. The system includes a position sensor and a controller. The position sensor generates position signals indicative of a position of the work surface. The controller is configured to store a final design plane, store a proximal end dump location along the work surface at the second work area, receive position signals from the position sensor, and determine the position of the work surface based upon the position signals. The controller is further configured to determine an amount of material to be moved from the first work area to the second work area based upon the final design plane and the position of the work surface, determine a plurality of distal end dump locations along the work surface at the second work area, with a distance between the proximal end dump location and each of the plurality of distal end dump locations defining a plurality of potential first layers of material. For each of the plurality of potential first layers of material, the controller is configured to determine a plurality of additional layers of material above the potential first layer of material, with each potential first layer of material plus the plurality of additional layers above the potential first layer of material being equal to the amount of material to be moved and defining a second work area material configuration. The controller is also configured to determine a cost associated with moving the amount of material at the second work area to form each second work area material configuration and select a lowest cost distal end dump location corresponding to a lowest cost second work area material configuration.

In another aspect, a controller-implemented method is provided for determining a lowest cost distal end dump location for moving material with a ground engaging work implement of a machine along a work surface from a first work area to a second work area. The method includes storing a final design plane, storing a proximal end dump location along the work surface at the second work area, receiving position signals from a position sensor, and determining a position of the work surface based upon position signals from the position sensor. The method further includes determining an amount of material to be moved from the first work area to the second work area based upon the final design plane and the position of the work surface, determining a plurality of distal end dump locations along the work surface at the second work area, with a distance between the proximal end dump location and each of the plurality of distal end dump locations defining a plurality of potential first layers of material, and for each of the plurality of potential first layers of material, determining a plurality of additional layers of material above the potential first layer of material, with each potential first layer of material plus the plurality of additional layers above the potential first layer of material being equal to the amount of material to be moved and defining a second work area material configuration. The method still further includes determining a cost associated with moving the amount of material at the second work area to form each second work area material configuration and selecting a lowest cost distal end dump location corresponding to a lowest cost second work area material configuration.

In still another aspect, a machine includes a prime mover, a ground engaging work implement for engaging a work surface to move material from a first work area to a second work area, a position sensor for generating position signals indicative of a position of the work surface, and a controller. The controller is configured to store a final design plane, store a proximal end dump location along the work surface at the second work area, receive position signals from the position sensor, and determine the position of the work surface based upon the position signals. The controller is further configured to determine an amount of material to be moved from the first work area to the second work area based upon the final design plane and the position of the work surface, determine a plurality of distal end dump locations along the work surface at the second work area, with a distance between the proximal end dump location and each of the plurality of distal end dump locations defining a plurality of potential first layers of material. For each of the plurality of potential first layers of material, the controller is configured to determine a plurality of additional layers of material above the potential first layer of material, with each potential first layer of material plus the plurality of additional layers above the potential first layer of material being equal to the amount of material to be moved and defining a second work area material configuration. The controller is also configured to determine a cost associated with moving the amount of material at the second work area to form each second work area material configuration and select a lowest cost distal end dump location corresponding to a lowest cost second work area material configuration.

DETAILED DESCRIPTION

Figure 1:
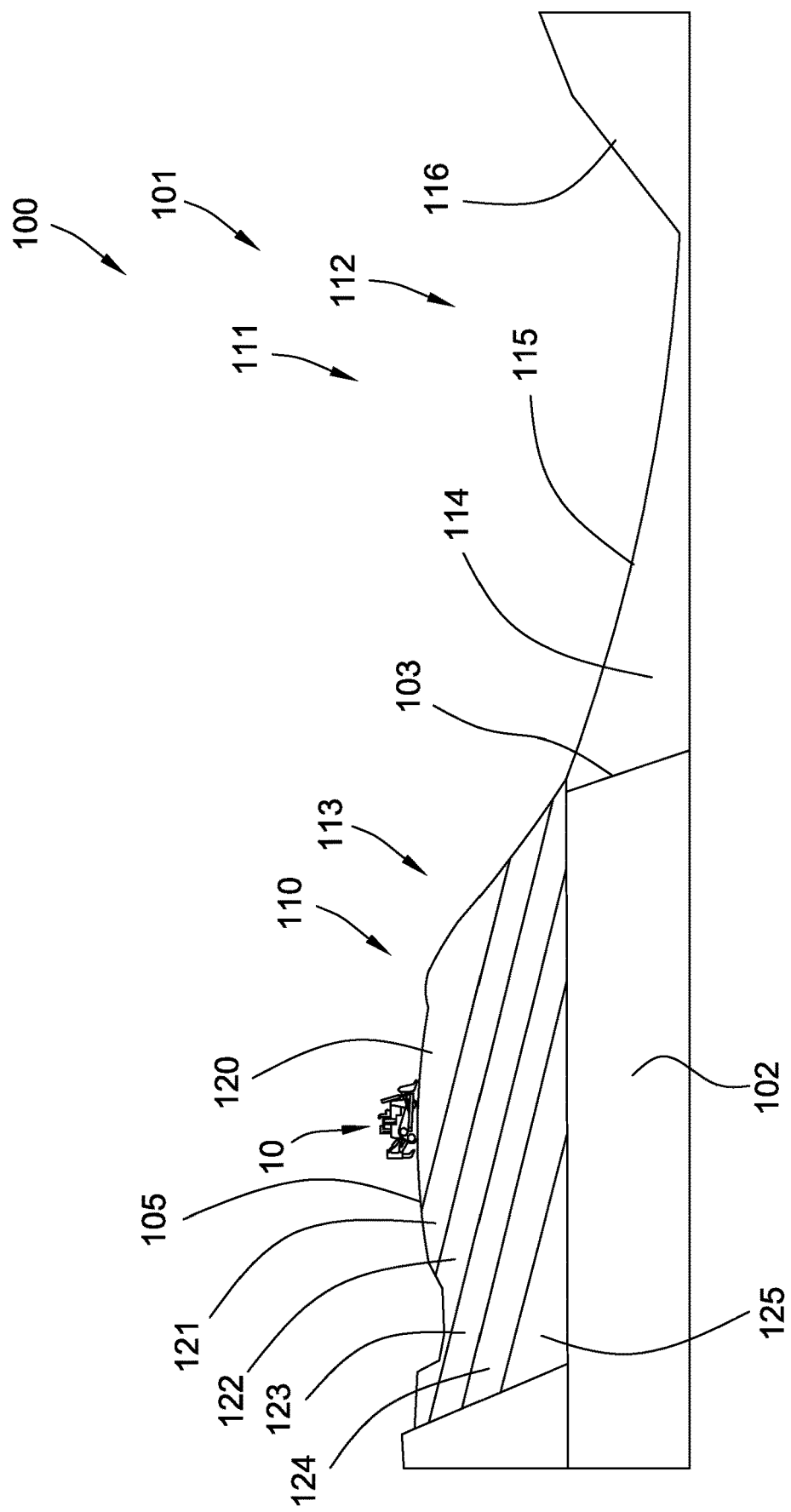
FIG. 1 depicts a diagrammatic cross-section of a portion of a work site with upper and lower layers of material illustrated.

FIG. 1 depicts a diagrammatic illustration of a portion 101 of a work site 100 which one or more machines may operate in an autonomous, a semi-autonomous, or a manual manner. Work site 100 is depicted as a mining site with lower layer 102 of material to be mined such as coal and an upper layer 105 of material such as overburden or topsoil that covers the lower layer. At some work sites 100, the overburden is removed from above a portion of the lower layer 102 of material at a first work area 110 and moved to a second work area 111. The exposed lower layer 102 of material is then removed and transported to a desired location at a remote site. The removal of the lower layer 102 of material creates an open area or void 112 into which overburden from a new or adjacent section of the upper layer 105 may be moved to expose another or adjacent portion of the lower layer. The process may be repeated about the work site 100 until the entire lower layer 102 of material is removed.

In some instances, the process of movement of the overburden may begin by moving a portion of the overburden into the void 112 adjacent the lower layer 102 such as with explosives. As depicted in FIG. 1, a portion of the upper layer 105 has been moved or displaced into the void 112 (to the right of the edge 103 of the lower layer 102 in FIG. 1). The area from which the overburden has been removed is indicated generally at 113 and the overburden moved into the void 112 is indicated at 114.

As a result of the movement of the overburden, by explosives and/or otherwise, the void 112 may have a shape as generally depicted in FIG. 1 with a first sloped surface 115 that slopes downward from generally adjacent the edge 103 of the lower layer 102 and a second sloped surface formed during a previous material movement process that extends upward from the first sloped surface. The second sloped surface may extend upward any desired distance and may be referred to as a low wall 116. In some instances, the upper end of the low wall 116 may be approximately at the same height as the upper surface of the lower layer 102. The remaining space of the void 112 is thus defined by the first sloped surface 115 and the low wall 116.

In some instances, machines 10 such as dozers may be used to move the overburden above the lower layer 102 to expose the lower layer for subsequent mining. To do so, the machines 10 may move the overburden into and above the void 112 by moving a series of relatively small layers or sections of material into the open area.

As used herein, a layer may refer to a layer or a section of material having a uniform or non-uniform (e.g., triangular) thickness or cross-section. For example, as depicted in FIG. 1, the remaining portion of the upper layer 105 of overburden to be removed is divided into a series of relatively smaller layers 120-125. Each smaller layer 120-125 may be moved from its position above the lower layer 102 to a position in or above the void 112 by utilizing the dozers to perform a series of material moving operations during which the overburden is moved from the first work area 110 to the second work area 111 to eventually expose the lower layer 102. In some instances, it may be desirable to leave a small amount of overburden on the lower layer 102 of material. Although depicted with six smaller layers 120-125, the upper layer 105 may be divided into any desired number of smaller layers. The number and position of the smaller layers may be determined by a planning system 47 described below or in any other manner.

Figure 2:
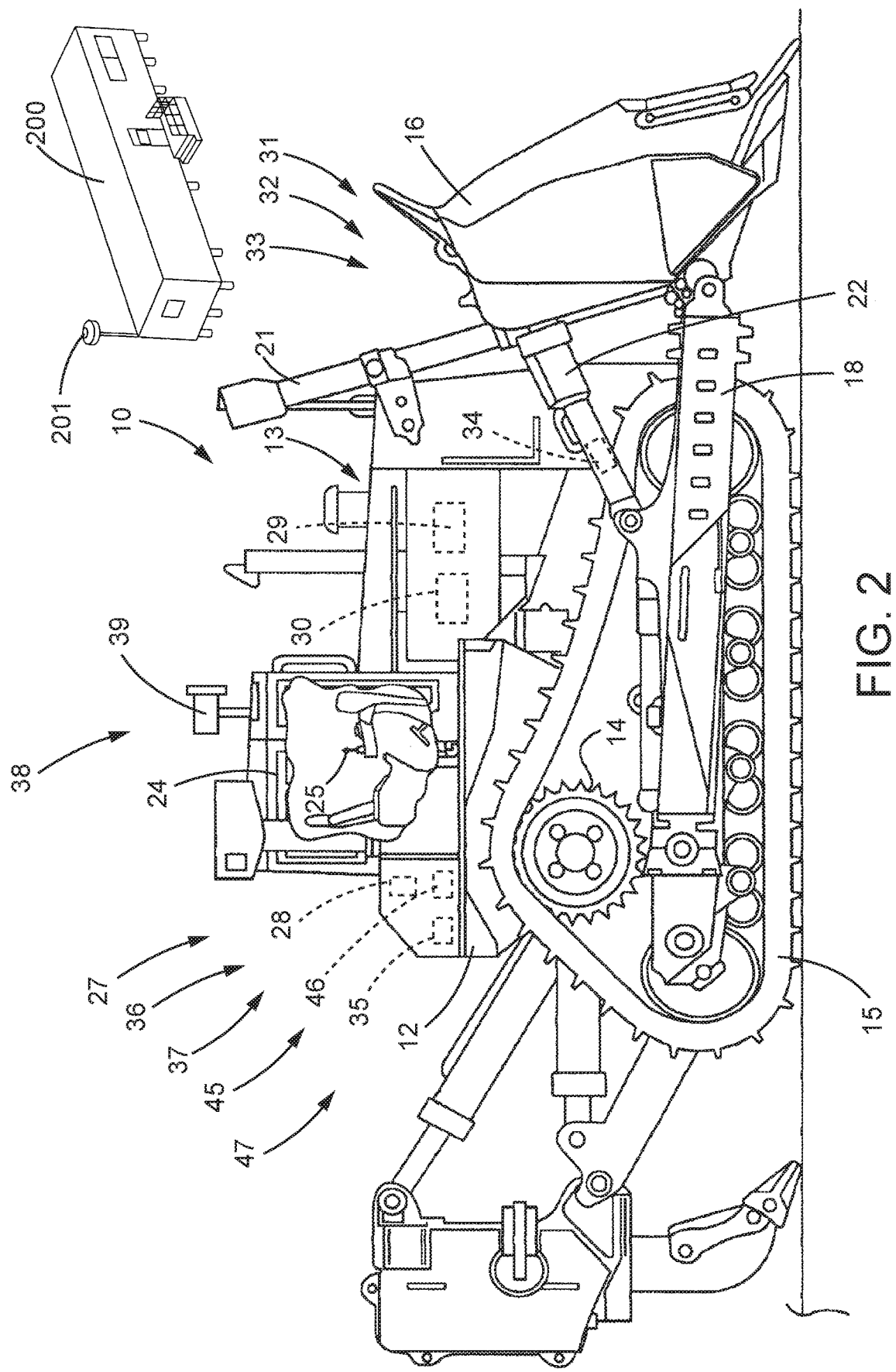
FIG. 2 depicts a diagrammatic illustration of a machine in accordance with the disclosure.

FIG. 2 depicts a diagrammatic illustration of a machine 10 such as a dozer with a ground engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Engine 13 and a transmission (not shown) are operatively connected to the drive sprockets 14, which drive tracks 15. The systems and methods of the disclosure may be used with any machine propulsion and drivetrain mechanisms applicable in the art for causing movement of the machine including hydrostatic, electric, or mechanical drives.

Blade 16 may be pivotably connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 45 as shown generally by an arrow in FIG. 2 indicating association with the machine 10. The control system 45 may include an electronic control module or controller 46 and a plurality of sensors. The controller 46 may receive input signals from an operator operating the machine 10 from within cab 24 or off-board the machine through a wireless communications system 201. The controller 46 may control the operation of various aspects of the machine 10 including the drivetrain and the hydraulic systems.

The controller 46 may be an electronic controller that operates in a logical fashion to perform operations, execute control algorithms, store and retrieve data and other desired operations. The controller 46 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 46 such as power supply circuitry, signal conditioning circuitry, driver circuitry, and other types of circuitry.

The controller 46 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 46 may be implemented in hardware and/or software without regard to the functionality. The controller 46 may rely on one or more data maps relating to the operating conditions and the operating environment of the machine 10 and the work site 100 that may be stored in the memory of controller. Each of these data maps may include a collection of data in the form of tables, graphs, and/or equations.

The control system 45 and the controller 46 may be located on the machine 10 and may also include components located remotely from the machine such as at a command center 200. The functionality of control system 45 may be distributed so that certain functions are performed at machine 10 and other functions are performed remotely. In such case, the control system 45 may include a communications system such as wireless communications system 201 for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position sensor 28 may include a plurality of individual sensors that cooperate to generate and provide position signals to controller 46 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 46 may use position signals from the position sensors 28 to determine the position of the machine 10 within work site 100. In other examples, the position sensor 28 may include a perception based system, or may use other systems such as lasers, sonar, or radar to determine all or some aspects of the position of machine 10.

The position sensing system 27 may also be used to determine a ground speed of machine 10. Other sensors or a dedicated ground speed sensor may alternatively be used to determine the ground speed of the machine 10. In addition, the position sensing system 27 may also be used to determine the position of the work surface upon which the machine 10 is moving. More specifically, based upon known dimensions of the machine 10 and the position of the machine at the work site 100, the position of the work surface may also be determined. As a result, the position sensing system 27 may operate as either or both of a machine position sensing system and a work surface position sensing system. Similarly, the position sensor 28 may operate as either or both of a machine position sensor and a work surface position sensor. Other sensors or a dedicated work surface position sensor may alternatively be used to determine the position of the work surface.

Sensors may be provided to monitor the operating conditions of the engine 13 and drivetrain such as an engine speed sensor 29 and a torque converter speed sensor 30. Other sensors necessary or desirable for operating the machine 10 may be provided.

The control system 45 may include an additional system such as a change in terrain detection system 31 shown generally by an arrow in FIG. 2 indicating association with the machine 10. One type of change in terrain detection system 31 that may be used to sense a crest at the work site 100 may be an implement load monitoring system 32 shown generally by an arrow in FIG. 2. The implement load monitoring system 32 may include any of a variety of different types of implement load sensors depicted generally by an arrow in FIG. 2 as an implement load sensor system 33 to measure the load on the ground engaging work implement or blade 16. For example, as blade 16 of machine 10 moves material over a crest, the load on the blade will be reduced. Accordingly, the implement load sensor system 33 may be utilized to measure or monitor the load on the blade 16 and a decrease in load may be registered by the controller 46 as a change in terrain due to the machine 10 being adjacent the crest. In other instances, an increase in load may indicate an incline or the machine 10 encountering a pile of material. In other words, the controller 46 may determine a change in terrain based at least in part upon a change in the load on blade 16.

In one embodiment, the implement load sensor system 33 may embody one or more pressure sensors 34 for use with one or more hydraulic cylinders, such as second hydraulic cylinders 22, associated with blade 16. Signals from the pressure sensor 34 indicative of the pressure within the second hydraulic cylinders 22 may be monitored by controller 46. Upon receipt of a signal indicating a substantial reduction in pressure within the second hydraulic cylinders 22, the controller 46 may determine that the load on blade 16 has been substantially reduced due to the material having been pushed over a crest. Other manners of determining a reduction in cylinder pressure associated with a reduction in the load on blade 16 are contemplated, including other manners of measuring the pressure within second hydraulic cylinders 22 and measuring the pressure within other cylinders associated with the blade. An increase in pressure indicative of an increase in load may be determined in a similar manner.

In another embodiment, the implement load sensor system 33 may embody sensors for measuring a difference between output from the engine 13 and the output from a torque converter (not shown). More specifically, the engine speed sensor 29 may be utilized to generate a signal indicative of the speed or output of the engine 13 and the torque converter speed sensor 30 may be utilized to monitor the output speed of the torque converter. During an operation such as moving material with blade 16, the engine output speed indicated by engine speed sensor 29 and the torque converter output speed indicated by torque converter speed sensor 30 may be relatively constant. Upon moving material over a crest with blade 16, the load on the blade will be substantially reduced and thus cause a change in the relative speeds between the engine 13 and the torque converter. Similarly, an opposite change in relative speeds may also be used to determine an incline. Accordingly, by monitoring the difference between the engine speed and the torque converter speed, changes in incline may be determined.

Other manners of measuring differences between prime mover output and other components within the propulsion and drivetrain mechanisms that are reflective of a change in load on the implement are also contemplated. Still further, in alternate embodiments in which the machine propulsion and drivetrain mechanisms are hydrostatic or electric, the implement load sensor system may embody other sensors that detect a difference between output from the prime mover and other aspects of the propulsion and drivetrain mechanisms that may be used by the controller 46 to detect a change in load on the blade 16.

In still another embodiment, implement load sensor system 33 may embody an acceleration sensor such as a three-axis accelerometer 35 for providing an acceleration signal indicative of the acceleration of the machine 10. Upon moving a load of material past a crest, the machine 10 may accelerate due to the reduction in load on the blade 16. Similarly, deceleration of the machine 10 may indicate that the machine 10 has encountered an incline. Controller 46 may utilize acceleration of the machine 10 to determine a change in terrain.

In addition to the implement load monitoring systems 32 described above, other change in terrain detection systems may be used either alone or in combination with more than one change in terrain detection system. For example, a change in terrain detection system may use other sensors as a change in terrain sensor for determining a change in terrain. In one example, a pitch angle, as indicated by a pitch angle sensor 36, that exceeds a threshold pitch angle or is outside of an expected range of pitch angles may indicate that the machine 10 is adjacent a crest or an incline. In another example, a change in pitch rate as indicated by a pitch rate sensor 37 that exceeds a threshold rate may indicate that the machine 10 is adjacent a crest or an incline.

Still further, additional systems and sensors may be used to determine a change in terrain or proximity of machine 10 to a crest or an incline. For example, a perception system 38 may also be used to detect the physical location of a crest or an incline. The perception system 38 may be mounted on or associated with the machine, as shown generally by an arrow in FIG. 2 indicating association with the machine. The perception system 38 may include one or more systems such as a radar system, a SONAR system, a LIDAR system, a camera vision system, and/or any other desired system that operate with associated perception sensors 39. Perception sensors 39 may generate data that is received by the controller 46 and used by the controller to determine the position of the work surface upon which the machine 10 is operating including the presence and position of obstacles within the range of the sensors. If desired, the perception system 38 may be used to generate an electronic map and/or images of the environment around machine 10 and the environment analyzed for changes in terrain.

In addition or the alternative, the perception system 38 may include one or more perception sensors 39 movably associated with the machine 10 such as sensors mounted on a mobile machine or device including a drone or unmanned aerial vehicle (not shown).

Machine 10 may incorporate any or all of the change in terrain detection systems disclosed herein and may incorporate other systems that perform similar functions, if desired.

Machine 10 may be configured to move material at the work site 100 according to one or more material movement plans along a path from an initial location such as the first work area 110 to a spread or dump location such as the second work area 111. The material movement plans may include, among other things, forming a plurality of spaced apart channels or slots that are cut into the work surface to assist in moving material from the initial location to the spread or dump location.

Figure 3:
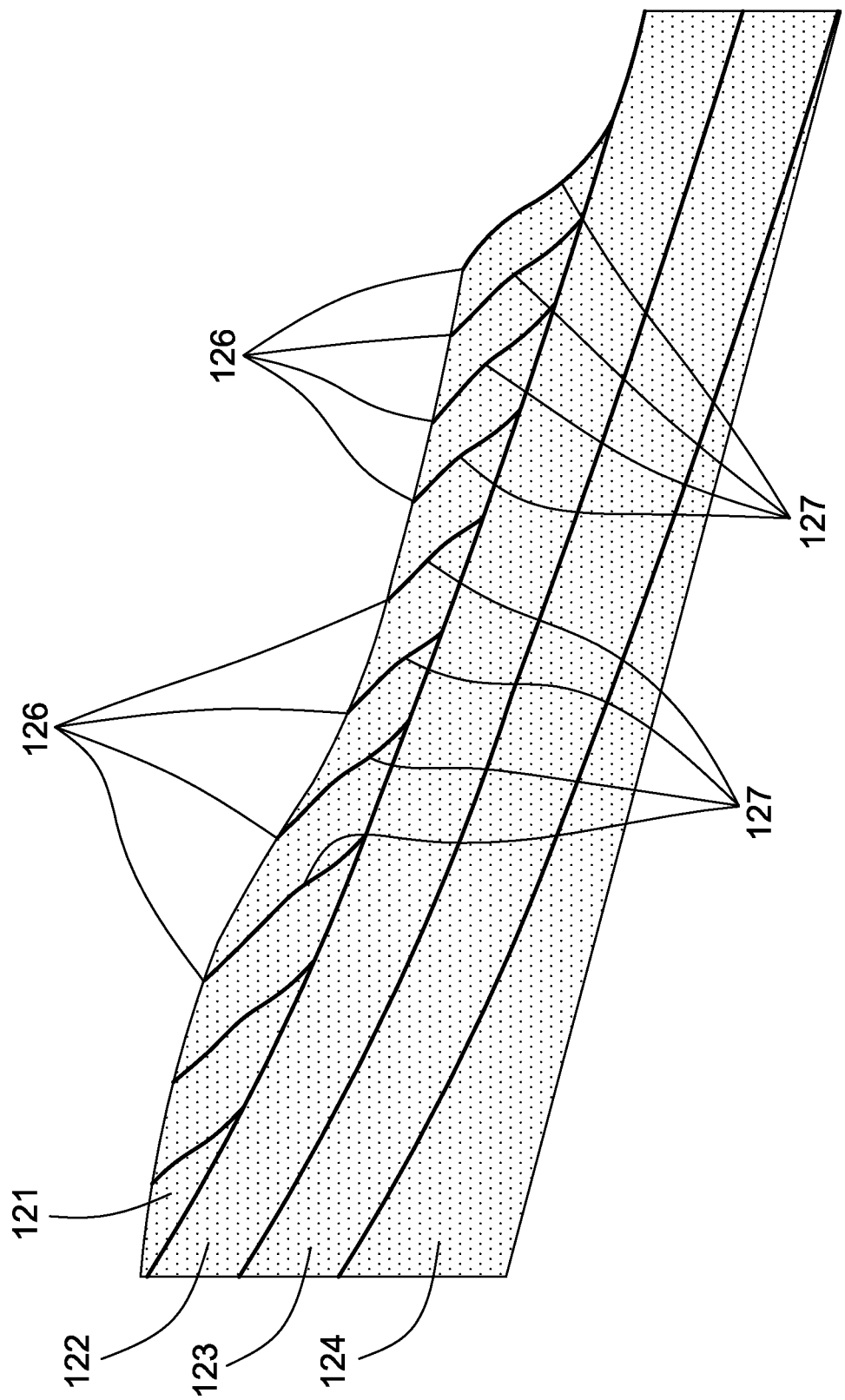
FIG. 3 depicts an enlarged diagrammatic cross-section of a portion of a work site illustrating a plurality of cutting operations.

As stated above, when moving material or overburden from the first work area 110, the upper layer 105 of material may be divided into a plurality of relatively smaller layers 120-125. Each smaller layer 120-125 of material may be removed from the first work area 110 by performing a plurality of cut and carry operations. More specifically, referring to FIG. 3, the blade 16 of machine 10 may be positioned at a desired cut location 126 and the machine 10 operated so that the blade passes through one of the smaller layers 120-125 to a carry surface that may be defined by the next layer of material. The machine 10 with the load of material may travel along the carry surface to a dump or spread location such as the second work area 111. The machine 10 may be moved through a series of sequential cuts 127 at cut locations 126, which are spaced apart lengthwise along each layer 120-125 of material, until the lower layer 102 of material is exposed. When operating autonomously or semi-autonomously, the controller 46 may be configured to guide the machine 10 to execute each cut operation and carry the material along the carry surface to the second work area 111.

Figure 4:
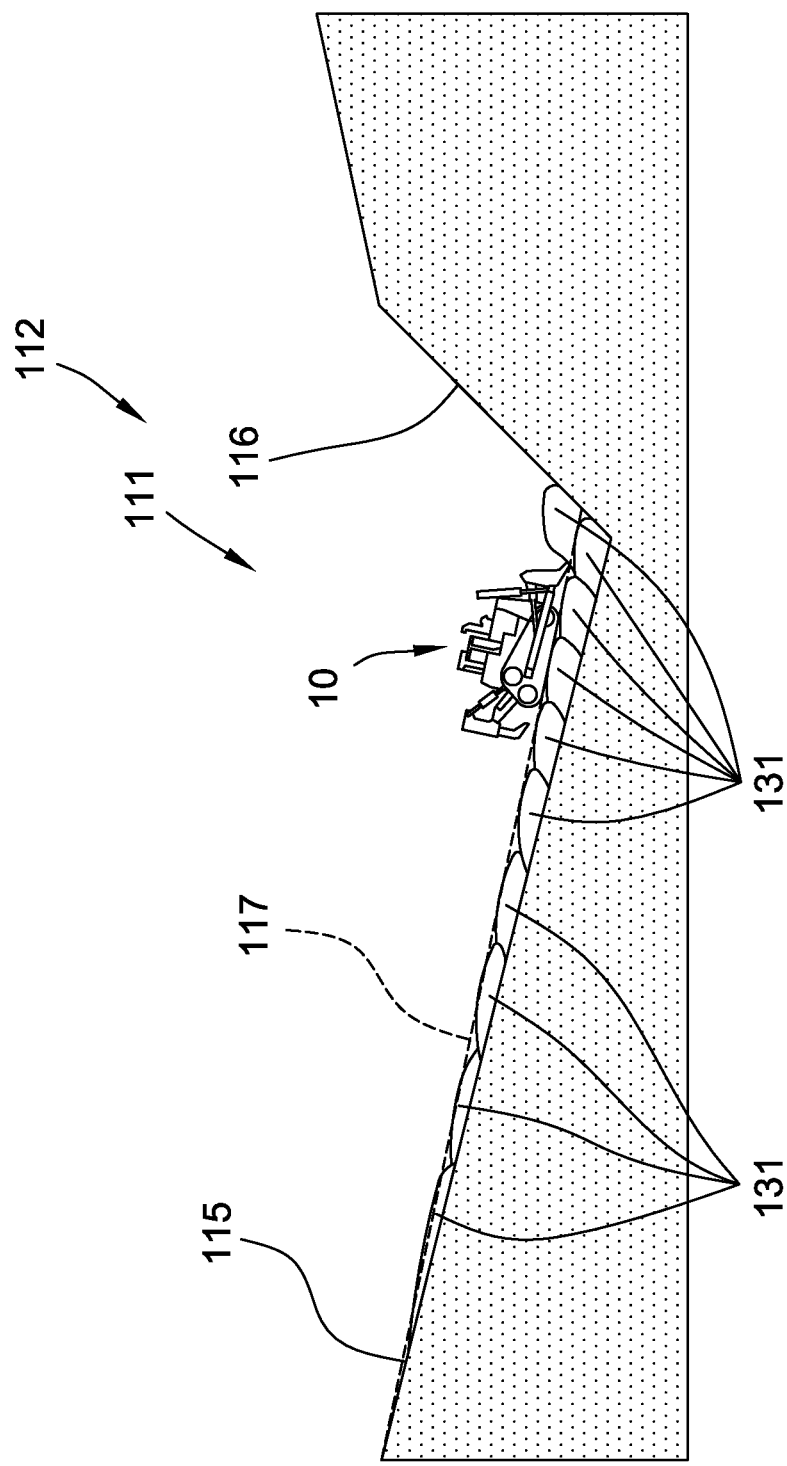
FIG. 4 depicts an enlarged diagrammatic cross-section of a portion of the work site of FIG. 1 illustrating the result of a plurality of backstacking operations.

Referring to FIG. 4, a process for spreading or dumping material at the second work area 111 involves pushing the material or overburden along the work surface until reaching a desired end of travel location. Upon reaching the desired end location, the machine 10 is operated in reverse which leaves a pile 131 of material on the work surface along which the machine is operating. The machine 10 is moved in reverse along the path of operation until reaching the next cut location and the next sequential material moving operation is performed.

In one embodiment, subsequent end of travel locations may be identified when the material being pushed by blade 16 engages the previously deposited pile 131 of material. Systems such as those used to monitor a change in terrain may detect when the material being pushed engages a previous pile 131 of material. More specifically, engagement or interaction of material being pushed with a previous pile 131 of material may be monitored by a change in load on the machine 10 and/or blade 16, deceleration of the machine, and/or a change in pitch angle of the machine. Other systems such the perception system 38 may be used in addition or instead.

In another embodiment, a planning system 47 of the control system 45 may, in addition or in the alternative, calculate or determine a plurality of end locations at which the machine 10 should cease forward movement and back up. The end locations may be determined so that the machine 10 leaves the piles 131 of material in the desired location upon generating a reversing command or instructions.

Upon reaching a desired position at which the layer of material should end, a new layer (indicated in dashed line at 117) of piles 131 of material may be begun and the process repeated. In some instances, the machine 10 may be used to smooth the surface of the piles 131 of material to create a generally uniform surface, such as the dashed line 117, prior to beginning a new layer of piles. The process of reversing the machine 10 to form layers of material by leaving sequential piles 131 of material as described above may sometimes be referred to as backstacking.

Each of the processes for cutting, carrying, and spreading or dumping the material may be performed autonomously, semi-autonomously, or manually, if desired. Other manners of spreading or dumping material at the second work area 111 are contemplated.

Control system 45 may include a module or planning system 47 for determining or planning various aspects of a material moving plan. The planning system 47 may determine the depth and location of each of the layers 120-125. In addition, the planning system 47 may determine the sequential cut locations 126 along each layer as well as the shape of the cuts 127 or loading profile through each layer. The planning system 47 may receive and store the characteristics of the material to be moved (e.g., density, moisture content, compactability, angle of repose) that may be used in the planning process.

Figure 5:
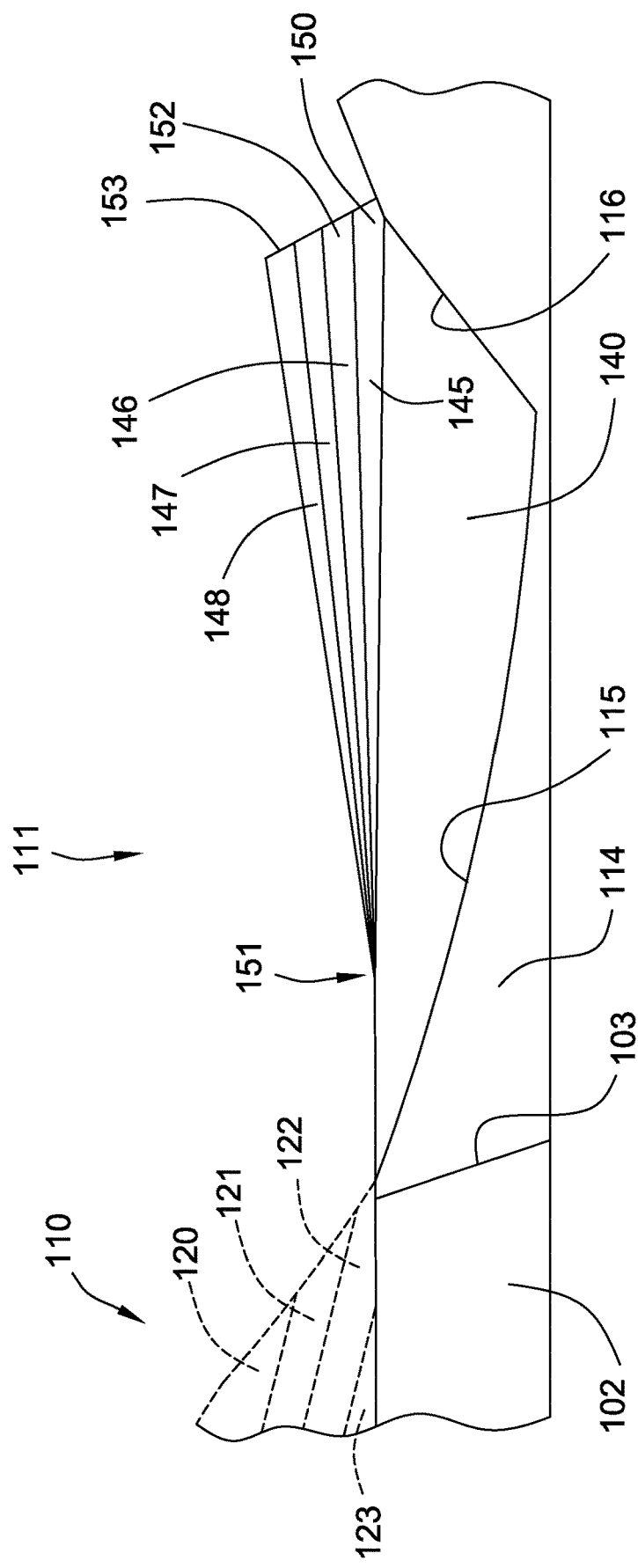
FIG. 5 depicts a diagrammatic cross-section of a portion of the work site of FIG. 1 with the material at a second work area in a first configuration void partially filled after an initial process.

The planning system 47 may also be operative to plan other aspects of a material moving plan such as the manner in which the material moved from the first work area 110 is dumped or spread at the second work area 111. In doing so, the planning system 47 may determine the amount of material to be moved from the first work area 110 in order to expose the lower layer 102 of material. The planning system 47 may organize or group the material to be moved so that it is dumped or spread at the second work area 111 as a plurality of layers or sections. As depicted in FIG. 5, layers 120-123 (FIG. 1) have been moved from the first work area 110 to the second work area 111 to fill the void 112 with material 140. Material from layers 124-125 may be moved from the first work area 110 to the second work area 111 and positioned on top of the material 140 such as with a backstacking process.

When utilizing a backstacking process at the second work area 111, the planning system 47 may determine an optimal or desired distal end dump location that will result in the lowest cost associated with carrying out each backstacking layer. For example, referring to FIG. 5, an example of a first layer to be formed by a back stacking process is depicted at 145. The first layer 145 is formed by utilizing a distal end dump location depicted at 150 and a proximal end dump location depicted at 151.

To determine the lowest cost structure for a backstacking layer, the proximal end dump location 151 and a configuration of the backstacking layer (i.e., the height and shape) may be determined, set or stored within controller 46 in any desired manner. Based upon the position of the proximal end dump location 151 and the configuration of the backstacking layer, the planning system 47 may evaluate a plurality of potential distal end dump locations and the material movement process associated with each distal end dump location to determine which potential distal end dump location of the current layer will result in the lowest cost solution for moving the material from the first work area 110 to the second work area 111.

When evaluating each distal end dump location, the planning system 47 may not only evaluate the process of moving material to form the first layer 145 of material to be positioned on the work surface, but also evaluate the processes of moving material to form all of the subsequent layers of material that will be sequentially positioned on top of the first layer 145. The subsequent or additional layers are depicted at 146-148 in FIG. 5.

To evaluate a distal end dump location, the planning system 47 may evaluate, such as by simulation, a material moving process in which material is moved from the first work area 110 along the work surface to its desired location at the second work area 111. It should be noted that while the planning system 47 may also evaluate the most efficient or cost-effective manner of cutting and carrying material at the first work area 110, such process is not described herein. While evaluating the material movement process at the second work area 111, the planning system 47 may evaluate each anticipated material movement or dump cycle with each cycle resulting in depositing a pile 131 (FIG. 4) of material along the work surface as part of a back stacking operation. As discussed in further detail below, the planning system 47 may evaluate a plurality of factors in determining the material movement cost such as the amount of fuel used, the length of time for the material moving process, whether the machine 10 is traveling on a slope, and usage costs of the machine.

The planning system 47 may further evaluate the costs associated with the movement of material from the first work area 110 to the second work area 111 to form the additional layers 146-148. In one example, for each additional layer 146-148, the planning system 47 may evaluate or simulate additional material movement cycles to form the additional layers based upon a desired or estimated proximal end dump location, a desired or estimated distal end dump location, and a desired backstacking layer configuration (i.e., the height and shape). The desired or estimated proximal end dump location and desired or estimated distal dump may be set in any manner. In an example, the distal end dump location of an additional layer may be set at a position a predetermined distance closer to the first work area 110 as compared to the distal end dump location of the previous or next lower layer. For example, in FIG. 5, the distal end dump location 152 of the layer 146 is closer to the first work area 110 than the distal end dump location 150 of the first layer 145. By setting each distal end dump location a predetermined distance closer to the first work area 110 as compared to that of a previous layer, the material moved to the second work area 111 may have a distal surface 153 sloped at a desired angle. The slope of the distal surface 153 may be modified by modifying the distance between the distal end dump locations between layers.

During the evaluation or analysis process, an initial distal end dump location may be selected and the planning system 47 may determine a cost associated with that distal end dump location. The cost may be determined by adding the costs associated with each expected material movement cycle to move the material to the second work area 111 based upon a specified configuration at the second work area.

The planning system 47 may then move the distal end dump location by a predetermined analysis distance or increment and repeat the evaluation process. The planning system 47 may repeat this process as desired until all possible distal end dump locations have been evaluated. In one embodiment, the planning system 47 may begin its evaluation process at a potential distal end dump location farthest from the first work area 110 and each new evaluation process includes moving the distal end dump location closer to the first work area by a distance equal to the predetermined analysis increment.

When determining which material movement process or configuration will result in the lowest cost solution, the planning system 47 may analyze a plurality of factors. Each of the factors may be stored as part of a look-up table or other data associated with the controller 46. As an example, one factor that may be analyzed or evaluated is the amount of fuel anticipated to be used by the machine for the material movement process. When estimating fuel usage, the planning system 47 may estimate the load on the machine 10 based upon the volume of material being moved and determine an amount of fuel used per hour at that load. The fuel usage may also take into account the anticipated gear in which the machine 10 will be operating. The cost associated with the amount of fuel anticipated to be used may be readily determined based upon expected fuel costs. As an example, the fuel costs or fuel factor may be expressed in terms of dollars per gallon of fuel used.

A second factor that may be analyzed or evaluated is the amount of time required to move the material from the first work area 110 to the second work area 111. A cost may be associated with the length of time of operation of the machine 10. Such time cost may include expenses associated with an operator, management personnel, other personnel at the work site 100, and any other desired expenses. As an example, a time or usage factor may be expressed in terms of dollars per hour of machine operation.

A third factor that may be analyzed or evaluated is the distance and angle of any slope along which the machine 10 will be traveling. Inefficiencies and additional wear on the machine 10 caused by operating the machine on a slope may also be considered while evaluating potential distal end dump locations. As an example, a slope or incline factor may be expressed in terms of dollars per distance climbed or descended. The slope cost or factor may also take into account the degree of slope as a greater slope may result in less efficient operation and higher wear on the machine 10. In some instances, there may be a first slope cost for a first portion of the path along which the machine 10 travels having a first slope and a second slope cost for a second portion of the path along which the machine 10 travels having a second slope.

A fourth factor that may be analyzed or evaluated is the machine usage cost or "wear and tear" on the machine 10. In some instances, the machine cost may be factored into the usage factor and the slope factor discussed above. As an example, machine usage factor may be expressed in terms of dollars per hour of machine operation.

In addition to evaluating or simulating the movement of each pile 131 of material at the second work area 111, other manners of estimating costs are contemplated. For example, the cost of moving the material may be estimated based upon an analysis of the movement of only some of the material In one embodiment, the cost of moving a layer of material may be estimated based upon the cost of moving only some of the piles of material that form that layer of material. For example, the cost of moving an entire layer of material may be calculated by determining the number of piles of material to be moved in the layer and further determining an average per pile cost based upon the cost of moving one or more piles of material that will be located near the center of that layer. In another example, the cost of moving an entire layer of material may be calculated by determining the number of piles of material to be moved in the layer and further determining an average per pile cost based upon an average of the cost of moving one or more piles of material to a location near the proximal end dump location of the layer and the cost of moving one or more piles of material to a location near the distal dump end position of the layer.

To perform a material moving operation, the controller 46 may evaluate the cost associated with all of the potential distal end dump locations of the next layer of material and the layers above the next layer, the controller 46 may determine the lowest cost distal end dump location. The controller 46 may then generate command signals to move the machine 10 to the desired cut location at the first work area 110 and subsequently perform the desired cut and carry operation to move material from the first work area to the second work area 111. Upon reaching the selected lowest-cost distal end dump location, the controller 46 may generate reversing commands to move the machine 10 to the next desired cut location at the first work area 110. The material movement process may be repeated until the layers of material at the second work area 111 are completed and the last pile of material for that layer is dumped or spread at the proximal end dump location. If desired, after all of the desired piles of material that will form the layer of material have been dumped or spread at the second work area 111, the machine 10 may operate to smooth the piles of material to shape the desired layer of material.

The planning system 47 may then repeat the planning process to determine the lowest cost distal end dump location for the next layer of material that is to be dumped or spread on top of the previously formed layer of material and the controller may generate the desired or necessary propulsion commands to move the material from the first work area 110 to the second work area 111. This process may be repeated until all of the material at the first work area 110 is moved to the second work area 111 or the process is otherwise terminated.

Figure 6:
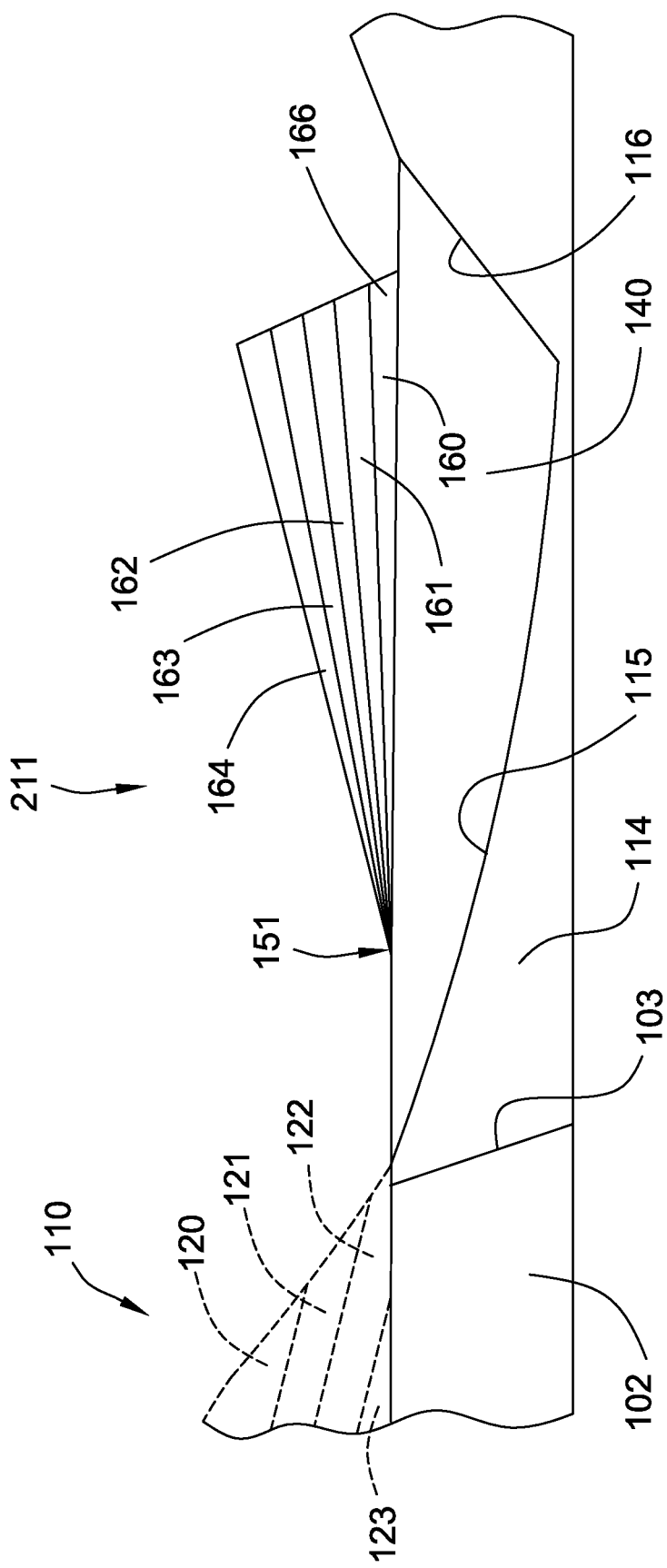
FIG. 6 depicts a diagrammatic cross-section similar to FIG. 5 but with the material at the second work area in a second configuration.

By adjusting the time factor and slope factor within the planning system 47, the shape or configuration of the material moved to the second work area 111 (e.g., the length and height) may be modified as desired. For example, FIG. 6 depicts an alternate embodiment for the configuration of the material at the second work area 211. In FIG. 6, the second work area 211 includes a first layer 160 with a distal end dump location 166 and a proximal end dump location 167. Additional layers 161-165 are sequentially formed on top of the first layer 160. As may be observed by comparing FIG. 5 to FIG. 6, the distal end dump location 166 of the first layer 160 at the second work area 211 is closer to the first work area 110 than the distal end dump location 150 of the first layer 145 at the second work area 111. To compensate for the reduced horizontal length of the layers 160-165 at the second work area 211 in FIG. 6, the second work area 211 includes one additional layer of material and has a steeper slope as compared to the second work area 111 in FIG. 5. In other words, in order for the configuration at the second work area 211 to have the same amount of material as the second work area 111, the second work area 211 must include an additional layer of material.

Figure 7:
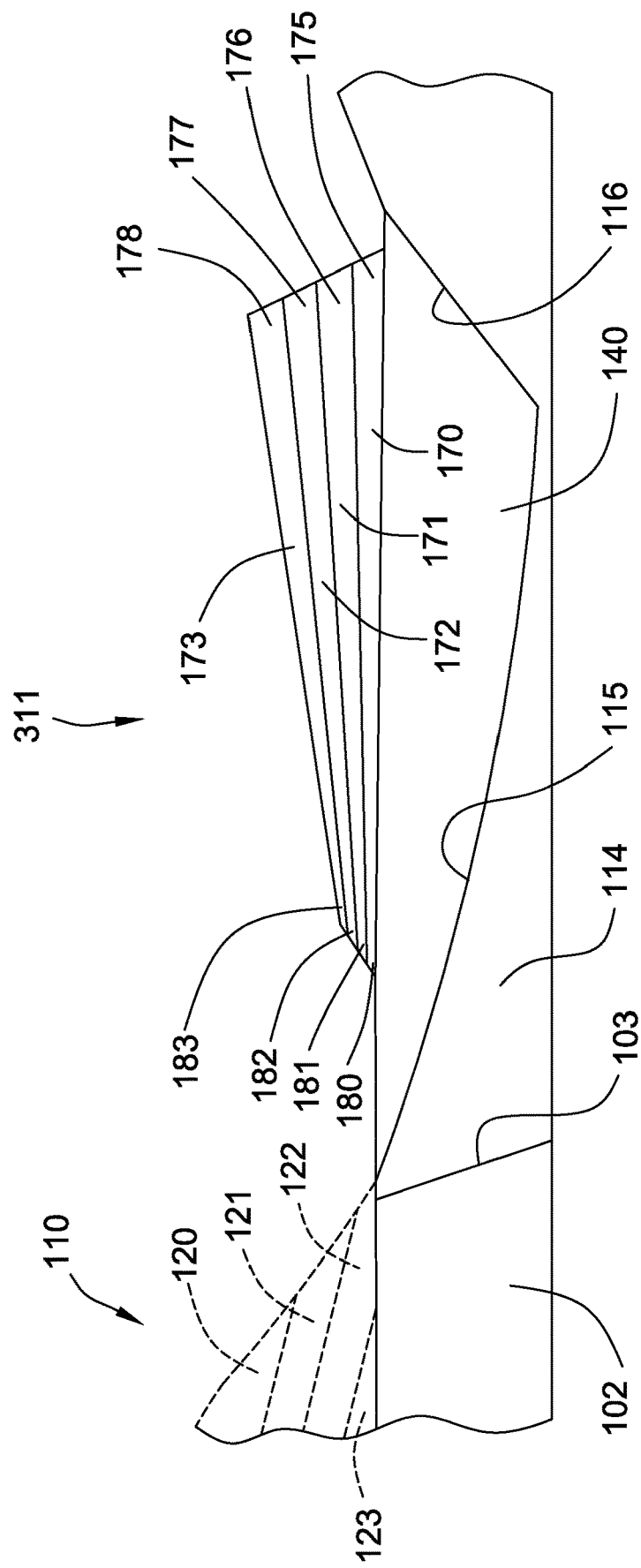
FIG. 7 depicts a diagrammatic cross-section similar to FIG. 5 but with the material at the third work area in a third configuration.

Although the proximal end dump location 151 in FIG. 5 is depicted as being in the same location for each of the layers 145-148, the proximal end dump locations do not need to be in the same position. Referring to FIG. 7, material from layers 124-125 (FIG. 1) is depicted after having been moved from the first work area 110 to the second work area 311 and positioned on top of the material 140 in a third configuration using a backstacking process. As depicted, a plurality of layers 170-173 of material are stacked on the material 140. Each layer 170-173 includes a distinct distal end dump location and a distinct proximal end location. More specifically, layer 170 has a distal end dump location 175 and a proximal end dump location 180, layer 171 has a distal end dump location 176 and a proximal end dump location 181, layer 172 has a distal end dump location 177 and a proximal end dump location 182, and layer 173 has a distal end dump location 178 and a proximal end dump location 183. The layers 170-173 are horizontally shorter than the layers 145-148 of FIG. 1 but have a greater vertical height so that the layers 145-148 and layers 170-173 may contain the same amount of material.

INDUSTRIAL APPLICABILITY

The industrial applicability of the system described herein will be readily appreciated from the forgoing discussion. The foregoing discussion is applicable to systems in which a plurality of machines 10 are operated autonomously, semi-autonomously, or manually at a work site 100 where it is desirable to move material from a first work area 110 to a second work area 111. Such systems may be used at a mining site, a landfill, a quarry, or any other area in such movement of material is desired. The system is applicable to work sites in which machine 10 are provided to move an upper layer 105 of material from a first work area 110 to expose a lower layer 102 of material to be mined.

Figure 8:
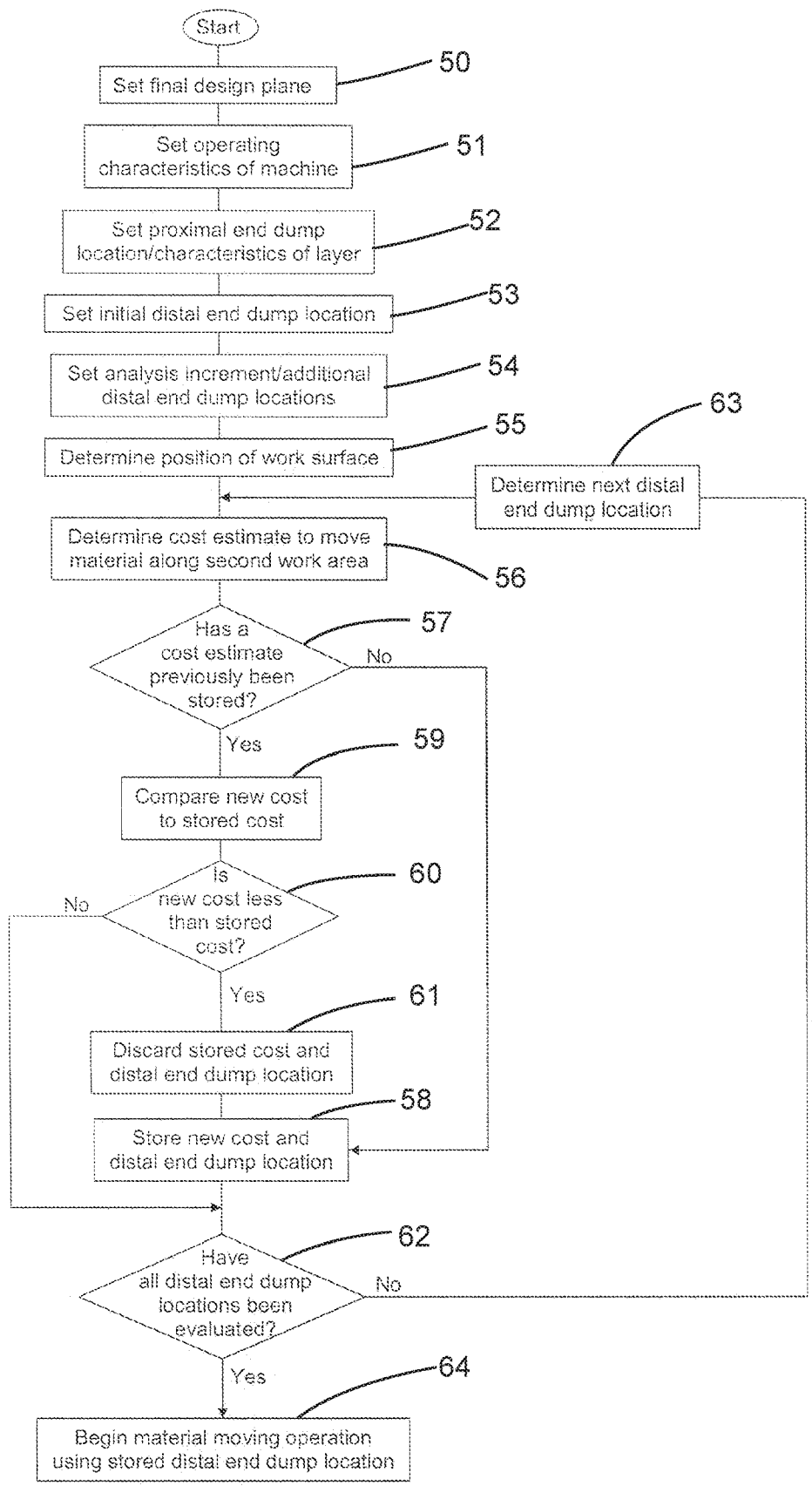
FIG. 8 depicts a flowchart illustrating a material moving process in accordance with the disclosure.

Referring to FIG. 8, a process is depicted for determining the lowest cost distal end dump location. The illustrated process utilizes an iterative approach but could be performed by analyzing a plurality of distal end dump locations and selecting the lowest cost location. At stage 50, the final design plane may be set or entered into the controller 46. The final design plane may correspond to the position of the lower layer 102 of material, a contour or plane slightly above the lower layer, or any other desired position. In one embodiment, the final design plane may be entered by an operator or some other personnel.

At stage 51, the operating characteristics of the machine 10 may be set or entered into controller 46. These operating characteristics may include a desired maximum load on the machine 10 and dimensions of the machine including those of blade 16. In an alternate embodiment, a desired maximum load on the blade 16 may be used rather than the maximum load on the machine 10. The dimensions of blade 16 may be used by controller 46 to determine the volume of material moved by the machine 10. The operating characteristics may also include fuel consumption characteristics as well as desired gear settings for different operating conditions. If desired, estimates of characteristics of the material to be moved may also be set or entered into the controller 46. The planning system 47 may utilize the characteristics of the material to be moved together with the operating characteristics of the machine 10 to more accurately plan the material moving operations.

At stage 52, the proximal end dump location of the next layer of material to be formed at the second work area 111 may be set or stored. In addition, the characteristics of the layers to be formed such as their height and shape may also be set or stored. At stage 53, the initial distal end dump location of the layer to be optimized at the second work area 111 may be set or stored. The analysis increment and the distance by which the distal end dump locations of the additional layers are to be moved towards the first work area 110 for subsequent layers may be set or stored at stage 54.

At stage 55, the position or configuration of the work surface at the first work area 110 and the second work area 111 may be determined. In one embodiment, the configuration of the work surface may be determined by moving a mapping vehicle along the work surface to establish its configuration. In some instances, the machine 10 may act as the mapping vehicle and be moved along the work surface and the position sensor 28 may provide a plurality of signals to controller 46 to indicate the position of the machine 10. The controller 46 may determine the position of the machine 10 within the work site 101 as well as the orientation of the machine such as its heading, pitch and roll. Based upon the known dimensions of the machine 10 stored within the controller 46 and the position sensor 28 defining a data or reference point on the machine, the controller 46 may determine the configuration of the work surface over which the machine 10 is traveling. In another embodiment, the configuration of the work surface may be determined by a topographical map of the earth at the work site 101. The relevant portion of the work site 101 may be mapped in any desired manner such as with unmanned aerial vehicle or drone (not shown).

The controller 46 may perform at stage 56 an analysis of the material movement process utilizing the distal end dump location, the proximal end dump location, and the desired characteristics of the layer to be formed as well as the distal end dump locations, proximal end dump locations, and the desired characteristics of the additional layers. In doing so, the controller 46 may be configured to evaluate the cost associated with moving each pile 131 of material that will form the layer of material at the second work area 111.

At decision stage 57, the controller 46 may determine whether a cost estimate has been previously stored. If no cost estimate has been previously stored, the controller may store the cost estimate and the corresponding distal end dump location at stage 58. If a cost estimate has been previously stored, the controller 46 may compare the new cost estimate to the previously stored cost estimate at stage 59.

At decision stage 60, the controller 46 may determine whether the new cost estimate is lower than the previously stored cost estimate. If the new cost estimate is lower than the previously stored cost estimate, the controller 46 may discard at stage 61 the previously stored cost estimate and its associated distal end dump location and store at stage 58 the new cost estimate and its associated distal end dump location. If, at stage 60, the new cost estimate is higher than the previously stored cost estimate, the controller 46 may skip steps 58 and 61 and continue to store the previously stored cost estimate and its associated distal end dump location.

At decision stage 62, the controller 46 may determine whether all or a sufficient number of the distal end dump locations have been evaluated. In some instances, the controller 46 may be configured to evaluate all of the potential distal end dump locations between the initial distal end dump location and the proximal end dump location. In other instances, the controller 46 may be configured to terminate its analysis of additional distal end dump locations if a predetermined number of distal end dump locations have been analyzed and the estimated cost of the material movement process is increasing as the potential distal end dump location is moved.

If all or a sufficient number of the distal end dump locations have not been evaluated, the controller 46 may determine at stage 63 the next distal end dump location and the process of stages 56-62 repeated to evaluate the cost of the new distal end dump location. In one embodiment, at stage 63, the distal end dump location may be moved by one analysis increment closer to the first work area 110. If all or a sufficient number of the distal end dump locations have been evaluated, the controller 46 may begin at stage 64 the material moving operation and utilize the last stored distal end dump location as the initial distal end dump location for the backstacking process.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for determining a lowest cost distal end dump location for moving material with a ground engaging work implement of a machine along a work surface from a first work area to a second work area, the system comprising:
   a position sensor for generating position signals indicative of a position of the work surface; and
   a controller configured to:
      store a final design plane;
      store a proximal end dump location along the work surface at the second work area;
      receive position signals from the position sensor;
      determine the position of the work surface based upon the position signals;
      determine an amount of material to be moved from the first work area to the second work area based upon the final design plane and the position of the work surface;
      determine a plurality of distal end dump locations along the work surface at the second work area, a distance between the proximal end dump location and each of the plurality of distal end dump locations defining a plurality of potential first layers of material;
      for each of the plurality of potential first layers of material, determine a plurality of additional layers of material above the potential first layer of material, each potential first layer of material plus the plurality of additional layers above the potential first layer of material being equal to the amount of material to be moved and each potential first layer of material plus the plurality of additional layers above the potential first layer of material defining a second work area material configuration;
      determine a cost associated with moving the amount of material to the second work area to form each second work area material configuration;
      select a lowest cost distal end dump location corresponding to a lowest cost second work area material configuration;
      determine a first cut location at the first work area;
      generate a propulsion command and control the machine to initiate a cut at the first cut location and move the machine loaded with material from the first cut location to the lowest cost distal end dump location
      upon reaching the lowest cost distal end dump location, move the machine in a reverse direction;
      perform a plurality of additional material moving operations, each additional material moving operation including:
         determining an additional cut location at the first work area;
         generating a propulsion command and control the machine to initiate a cut at the additional cut location and move the machine loaded with material from the additional cut location towards the lowest cost distal end dump location
         upon reaching an end of travel position, generating a reverse command to move the machine in a reverse direction; and
         repeating the additional material moving operation until reaching the proximal end dump location.

2. The system of claim 1, further comprising an implement load sensor and the controller is further configured to determine the end of travel position based upon signals from the implement load sensor indicative of a change in load on the ground engaging work implement.

3. The system of claim 1, further comprising a machine position sensor and the controller is further configured to generate a desired end of travel position, determine a machine position based upon signals from the machine position sensor, and generate the reverse command upon the machine position matching the desired end of travel position.

4. The system of claim 1, wherein the controller is configured to determine for each second work area material configuration a length of time used to move the amount of material at the second work area and generate a time cost associated with the length of time.

5. The system of claim 4, wherein the time cost associated with the length of time includes an operator cost and a machine usage cost.

6. The system of claim 4, wherein the controller is further configured to determine for each second work area material configuration an amount of fuel used to move the amount of material at the second work area and generate a fuel cost associated with the amount of fuel.

7. The system of claim 1, wherein the controller is further configured to determine for each second work area material configuration an amount of fuel used to move the amount of material at the second work area and generate a fuel cost associated with the amount of fuel.

8. The system of claim 1, wherein the controller is configured to determine for each second work area material configuration a slope cost based upon a slope along at least a portion of the second work area.

9. The system of claim 8, wherein the controller is further configured to determine for each second work area material configuration a first slope cost along a first portion of the second work area and a second slope cost along a second portion of the second work area.

10. The system of claim 1, wherein the controller is further configured to store characteristics of a potential first layer and each additional layer of material.

11. A controller-implemented method for determining a lowest cost distal end dump location for moving material with a ground engaging work implement of a machine along a work surface from a first work area to a second work area, the method comprising:
storing a final design plane;
storing a proximal end dump location along the work surface at the second work area;
receiving position signals from a position sensor;
determining a position of the work surface based upon position signals from the position sensor;
determining an amount of material to be moved from the first work area to the second work area based upon the final design plane and the position of the work surface;
determining a plurality of distal end dump locations along the work surface at the second work area, a distance between the proximal end dump location and each of the plurality of distal end dump locations defining a plurality of potential first layers of material;
for each of the plurality of potential first layers of material, determining a plurality of additional layers of material above the potential first layer of material, each potential first layer of material plus the plurality of additional layers above the potential first layer of material being equal to the amount of material to be moved and each potential first layer of material plus the plurality of additional layers above the potential first layer of material defining a second work area material configuration;
determining a cost associated with moving the amount of material to the second work area to form each second work area material configuration;
selecting a lowest cost distal end dump location corresponding to a lowest cost second work area material configuration;
determining a first cut location at the first work area;
generating a propulsion command and controlling, by the controller, the machine to initiate a cut at the first cut location and move the machine loaded with material from the first cut location to the lowest cost distal end dump location
upon reaching the lowest cost distal end dump location, moving the machine in a reverse direction;
performing a plurality of additional material moving operations, each additional material moving operation including:
determining an additional cut location at the first work area;
generating a propulsion command and controlling, by the controller, the machine to initiate a cut at the additional cut location and move the machine loaded with material from the additional cut location towards the lowest cost distal end dump location
upon reaching an end of travel position, generating a reverse command to move the machine in a reverse direction; and
repeating the additional material moving operation until reaching the proximal end dump location.

12. The method of claim 11, further including determining the end of travel position based upon signals from an implement load sensor indicative of a change in load on the ground engaging work implement.

13. The method of claim 11, further including generating a desired end of travel position, determining a machine position based upon signals from a machine position sensor, and generating the reverse command upon the machine position matching the desired end of travel position.

14. The method of claim 11, further including determining for each second work area material configuration a length of time used to move the amount of material at the second work area and generating a time cost associated with the length of time.

15. The method of claim 14, further including determining for each second work area material configuration an amount of fuel used to move the amount of material at the second work area and generating a fuel cost associated with the amount of fuel.

16. The method of claim 11, further including determining for each second work area material configuration a slope cost based upon a slope along at least a portion of the second work area.

17. The method of claim 16, further including determining for each second work area material configuration a first slope cost along a first portion of the second work area and a second slope cost along a second portion of the second work area.

18. A machine comprising:
a prime mover;
a ground engaging work implement for engaging a work surface to move material from a first work area to a second work area;
a position sensor for generating position signals indicative of a position of the work surface; and
a controller configured to:
store a final design plane;
store a proximal end dump location along the work surface at the second work area;
receive position signals from the position sensor;
determine the position of the work surface based upon the position signals;
determine an amount of material to be moved from the first work area to the second work area based upon the final design plane and the position of the work surface;
determine a plurality of distal end dump locations along the work surface at the second work area, a distance between the proximal end dump location and each of the plurality of distal end dump locations defining a plurality of potential first layers of material;
for each of the plurality of potential first layers of material, determine a plurality of additional layers of material above the potential first layer of material, each potential first layer of material plus the plurality of additional layers above the potential first layer of material being equal to the amount of material to be moved and each potential first layer of material plus the plurality of additional layers above the potential first layer of material defining a second work area material configuration;

determine a cost associated with moving the amount of material to the second work area to form each second work area material configuration; and select a lowest cost distal end dump location corresponding to a lowest cost second work area material configuration;

determine a first cut location at the first work area;

generate a propulsion command and control the machine to initiate a cut at the first cut location and move the machine loaded with material from the first cut location to the lowest cost distal end dump location upon reaching the lowest cost distal end dump location, move the machine in a reverse direction;

perform a of addition material moving operations, each additional material moving operation including:

determining an additional cut location at the first work area;

generating a propulsion command and controlling the machine to initiate a cut at the additional cut location and move the machine loaded with material from the additional cut location towards the lowest cost distal end dump location upon reaching an end of travel position, generating a reverse command to move the machine in a reverse direction; and repeating the additional material moving operation until reaching the proximal end dump location.

* * * * *